United States Patent
Davidsson et al.

(12)

(10) Patent No.: US 10,527,451 B2
(45) Date of Patent: Jan. 7, 2020

(54) METHOD AND SYSTEM FOR IN A TIMED MANNER ENABLING A USER DEVICE ON THE MOVE TO UTILIZE DIGITAL CONTENT ASSOCIATED WITH ENTITIES AHEAD

(71) Applicant: Volvo Car Corporation, Gothenburg (SE)

(72) Inventors: Staffan Davidsson, Vastra Frolunda (SE); Magnus Ronnang, Vastra Frolunda (SE)

(73) Assignee: Volvo Car Corporation, Gothenburg (SE)

( * ) Notice: Subject to any disclaimer, the term of this patent is extended or adjusted under 35 U.S.C. 154(b) by 222 days.

(21) Appl. No.: 15/474,065

(22) Filed: Mar. 30, 2017

(65) Prior Publication Data

US 2017/0307399 A1 Oct. 26, 2017

(30) Foreign Application Priority Data

Apr. 26, 2016 (EP) .................................... 16167095

(51) Int. Cl.
*G01C 21/36* (2006.01)
*H04W 4/029* (2018.01)
*H04W 4/02* (2018.01)

(52) U.S. Cl.
CPC ..... *G01C 21/3697* (2013.01); *G01C 21/3682* (2013.01); *H04W 4/023* (2013.01); *H04W 4/027* (2013.01); *H04W 4/029* (2018.02)

(58) Field of Classification Search
CPC ............ G01C 21/3697; G01C 21/3682; G01C 21/3679; G01C 21/367; H04W 4/029

USPC ......................................... 701/438
See application file for complete search history.

(56) References Cited

U.S. PATENT DOCUMENTS

| 6,401,034 | B1 | 6/2002 | Kaplan et al. | |
|---|---|---|---|---|
| 8,838,382 | B2 | 9/2014 | Drysdale | |
| 2007/0118279 | A1* | 5/2007 | Kudo ................. | G01C 21/3679 701/532 |
| 2010/0198502 | A1* | 8/2010 | Yamazaki .......... | G01C 21/3679 701/533 |
| 2010/0248746 | A1 | 9/2010 | Saavedra et al. | |

(Continued)

FOREIGN PATENT DOCUMENTS

| WO | 2009/121299 A1 | 10/2009 |
|---|---|---|
| WO | 2010/111833 A1 | 10/2010 |

*Primary Examiner* — Nadeem Odeh
(74) *Attorney, Agent, or Firm* — Snyder, Clark, Lesch & Chung, LLP

(57) ABSTRACT

The disclosure relates to a content selection system for enabling a user device on the move to utilize content associated with an entity located ahead of the user device. The content selection system determines a current position and travel direction of the user device, determines a current travel remainder for moving along a travel route from the current position to the entity located ahead of the user device, based on stored geographical location associated with the entity. The content selection system compares the travel remainder to a maximum threshold value associated with the entity. The content selection system enables content associated with the entity to be utilized by the user device, when the travel remainder is equal to or lower than the maximum threshold value. The disclosure also relates to a user device comprising at least a portion of the content selection system.

15 Claims, 7 Drawing Sheets

(56) References Cited

U.S. PATENT DOCUMENTS

| | | | |
|---|---|---|---|
| 2011/0078238 A1* | 3/2011 | Sakka | H04L 67/18 709/203 |
| 2011/0079238 A1 | 4/2011 | Takehana | |
| 2011/0106429 A1* | 5/2011 | Poppen | G01C 21/3476 701/533 |
| 2011/0173229 A1 | 7/2011 | Choudhury et al. | |
| 2011/0178811 A1* | 7/2011 | Sheridan | G01C 21/362 705/1.1 |
| 2013/0215009 A1* | 8/2013 | Fukumoto | G09G 5/37 345/156 |
| 2014/0039792 A1* | 2/2014 | Seetharam | H04W 4/029 701/538 |
| 2015/0226566 A1 | 8/2015 | North et al. | |
| 2016/0146623 A1* | 5/2016 | Ren | G06F 16/9024 701/400 |
| 2016/0169695 A1* | 6/2016 | Hall | G06Q 30/0261 701/426 |

* cited by examiner

| 6 Entity | 601 Location | 8 Maximum threshold value | 41 Content | |
|---|---|---|---|---|
| | | | POI data | Media content |
| 61 | 611 | 81, 811,812 | 411, 4111 | 411, 4112 |
| 62 | 621 | 82, 821,822 | 412, 4121 | 412, 4122 |
| ... | ... | ... | ... | ... |
| n | $x_n, y_n$ | nth maximum threshold value | nth POI data | nth piece of media content |

40 Data table

Fig. 5

METHOD AND SYSTEM FOR IN A TIMED MANNER ENABLING A USER DEVICE ON THE MOVE TO UTILIZE DIGITAL CONTENT ASSOCIATED WITH ENTITIES AHEAD

RELATED APPLICATION

This application claims priority under 35 U.S.C. § 119 based on European Patent Application No. 16167095.5, filed Apr. 26, 2016, the disclosure of which is hereby incorporated by reference herein.

TECHNICAL FIELD

The present disclosure relates to a content selection system and a method performed therein for in a well-timed manner enabling a user device on the move to utilize digital content associated with one or more entities located ahead of the user device.

BACKGROUND

While driving, a vehicle driver commonly prefers, perhaps along with fellow vehicle occupants, to simultaneously be entertained, for instance by listening to the radio. The reasons for that may, for instance, relate to taking the opportunity to keep up to date with news updates and/or listening to music, and/or being kept informed of the traffic situation. As a side effect, listening to the radio may be mind-stimulating to the vehicle driver, thus assisting said driver in maintaining his or her attention to thereby drive more safely, and furthermore to enable said driver to, to greater extent, have a pleasant driving experience. A further approach which potentially may improve the driving experience and/or may be mind-stimulating to the driver and/or fellow vehicle occupants, may be to provide entertainment in the form of information associated with an entity such as a landmark, area of interest, point of interest, attraction, region or the like, in the vicinity of—or lying ahead of—the vehicle. U.S. Pat. No. 8,838,382, for instance, enables automated tour guides and other computerized position based devices—such as e.g. Smartphones and GPS equipped vehicle devices—to play back tour guide audio narration and other media based, at least in part, on the user's geographic position or position history. However, although U.S. Pat. No. 8,838,382 enables sophisticated tour guide functionality—by enabling content such as tour guide audio, text, graphic and URL associated with entities in the vicinity of a location tracking user device to be provided to said user device in an efficient manner—there is still room for improvements regarding which content is provided to the user device, and when.

SUMMARY OF THE INVENTION

It is therefore an object of embodiments herein to enable a user device on the move to utilize digital content only of those entities ahead which currently, i.e. at the time of determining the current position of the user device, are considered relevant.

According to a first aspect of embodiments herein, the object is achieved by a method performed by a content selection system for in a timed manner enabling a user device on the move to utilize digital content associated with one or more entities located ahead of the user device. The content selection system determines a current position and a current travel direction of the user device. The content selection system furthermore determines a current travel remainder for moving along a travel route from the current position to at least a first entity located ahead of the user device, based on a first digitally stored geographical location associated with the first entity. Moreover, the content selection system compares the travel remainder to at least a first digitally stored maximum threshold value associated with the first entity. The content selection system further enables a first piece of digital content associated with the first entity to be utilized by the user device, when the travel remainder is equal to or lower than the at least first maximum threshold value.

Thereby, there is introduced an approach which assists in allowing only currently adequate content to be presented in and/or by a user device in motion. That is, since a current position and a current travel direction of the user device is determined, a prevailing estimated location of the user device is established, as well as a prevailing estimated direction of travel thereof. Moreover, since a current travel remainder for moving along a travel route from the current position to at least a first entity located ahead of the user device is determined, based on a first digitally stored geographical location associated with the first entity, a respective remainder for moving from the current user device position along a respective presumed travelable route to one or more entities is established taking into consideration at least the respective location(s) of the one or more entities. Since further the travel remainder is compared to at least a first digitally stored maximum threshold value associated with the first entity, the travel remainder is weighed against one or more maximum threshold values. Moreover, since a first piece of digital content associated with the first entity is enabled to be utilized by the user device, when the travel remainder is equal to or lower than the at least first maximum threshold value, digital content of the first entity is not made available to the user device until the travel remainder is determined—by the previous comparing action—to have a value equal to or lower than the at least first maximum threshold value. Accordingly, only digital content of entities determined to have—or to have had—maximum threshold values greater than the corresponding travel remainder, is enabled to be utilized—e.g. presented—by the user device. For that reason, an approach is provided which enables a user device on the move to utilize digital content only of those entities ahead which currently are considered relevant. The technical features and corresponding advantages of the above mentioned method will be discussed in further detail in the following.

By introducing a method performed by a content selection system for in a timed manner enabling a user device on the move to utilize digital content associated with one or more entities located ahead of the user device, an approach is provided which assists in allowing only currently adequate content to be presented in and/or by a user device in motion. The "content selection system" may at least partly be implemented in one or several servers and/or in one or several clouds, which furthermore may be adapted to communicate, e.g. wirelessly, with the user device and/or a vehicle on-board which the user device may be carried. Such a communication may for instance take place directly with the user device and/or said vehicle, and/or via an intermediate system adapted to wirelessly communicate with vehicles, remotely control functionality of the vehicles, and/or hold updated positions and/or information associated with the vehicles; for instance a management and/or assisting system such as e.g. Volvo On Call. Additionally or alternatively, the content selection system may at least partly be implemented in the user device itself. "User device" may for instance refer to a mobile user device, which mobile user device further may have navigating abilities. The "user device" may accordingly refer to, for instance, a multi-functional smart phone, mobile phone, mobile terminal or wireless terminal, portable computer such as a laptop, PDA or tablet computer, tablet such as an iPad, Pocket PC, and/or mobile navigation device. Furthermore, the "user device"—and/or a vehicle on which the user device may be carried—may be adapted to have online abilities, for instance by supporting Wi-Fi functionality, or by being adapted to be in radio communication with a radio communications network, such as cellular communications network, e.g. LTE, EDGE, CDMA, 4G, 3G, GPRS, or GSM, and/or an equivalent or successor thereof. Moreover, the "user device" may comprise resources such as speaker(s) commonly utilized to present audio, and/or one or several displays commonly utilized to display e.g. graphic, video, digital images, animations and/or text etc.

The expression of "a user device on the move" may refer to a "moving user device", "horizontally moving user device", "user device in horizontal motion", "user device moving in parallel to the ground" and/or "travelling user device". It should however be noted that according to an example, the user device need not necessarily be constantly on the move. This method may namely according to said example be conducted during a period when a user device is not moving, for example when a user is sitting or standing still for a period of time, or when a vehicle is parked or stuck in a traffic jam. Moreover, "user device on the move" may according to an example refer to "user device on-board a vehicle", where "vehicle" may be represented by any arbitrary vehicle, for instance an engine-propelled vehicle such as car, truck, lorry, van, bus, motor cycle, scooter, tractor, military vehicle, vessel, boat etc., a rail-bound vehicle, such as e.g. a train or tram, or a bicycle. The vehicle may further comprise, or have on-board, a commonly known positioning system, such as a global positioning system, navigation system or the like. Moreover, the "user device" may be adapted to communicate with the vehicle on which it may be carried. The expression of the user device being adapted to "communicate with the vehicle", may refer to the user device being configured to be in communication with the vehicle, e.g. the in-vehicle system thereof, such that information and/or data may be transferred between the vehicle and the user device. Such communication may for instance be accomplished physically, such as via USB connection, and/or wirelessly, such as via Bluetooth, WiFi, or the like; additionally or alternatively, the connection may be accomplished via the intermediate system discussed above and/or one or more clouds. Said expression may further refer to the user device being adapted to be "paired" and/or adapted to "be in connection" with the vehicle. The "user device" may in that context be referred to as a "nomadic device". Possibly, in order to be paired, identification of the nomadic device may be necessary, and/or authentication of the vehicle occupant, e.g. the driver. While the nomadic device is paired, a vehicle occupant may utilize functionality provided by the content selection system to the nomadic device, via the in-vehicle system. Accordingly, resources such as one or more loud speakers and/or displays of the in-vehicle system may be utilized to e.g. present said functionality provided by the content selection system. Additionally or alternatively, the "user device" may be comprised in and/or integrated with the vehicle, whereby the user device subsequently may refer to an in-vehicle system or infotainment system of said vehicle.

"Digital content" may for instance refer to "digitally stored content", "digital data", "digital media", "data content", "data record", "media file", "media content", "audio media file", "Point of Interest data", and/or "Point of Interest icon", and may further refer to arbitrary digital information such as audio, text, graphic, video, URL, TTS (Text to Speech) etc. which the user device is able to receive and/or store, and which the user device subsequently may be able to utilize, e.g. present. "Digital content" may furthermore, according to an example, refer to "filtered digital content", "adequate digital content" and/or "relevant digital content". The "digital content" may be obtained from computer memory either stored e.g. in the user device's memory and/or external or remote data sources, such as in one or more clouds and/or one or more servers, e.g. an audio media server. Moreover, "entity" may in this context refer to any arbitrary physical entity such as a "geographical location", "landmark," "point of interest", "area of interest", "place of interest", "region of interest", "business or municipal operation or organisation" etc., such as for instance a tourist attraction. Accordingly, the expression "digital content associated with one or more entities" may refer to one or more pieces of content associated with respective entity, such as e.g. digitally stored curiosa and/or information related to the exemplifying tourist attraction. Furthermore, digital content "associated with" one or more entities, may refer to digital content "tagged with", "related to", "linked with", "labelled to be associated with", and/or "categorized to be associated with" one or more entities. Entities "located" ahead of the user device may refer to entities "positioned" and/or "with geographical locations" ahead of the user device, whereas entities located "ahead" of the user device, may refer to entities located "further ahead", "in a direction of travel", "in a direction of a road of travel" and/or "in the vicinity" of the user device. Moreover, the expression "in a timed manner enabling" may refer to "timely enabling", "adequately enabling", "in an adequate manner enabling", and/or "in a filtered manner enabling", whereas "enabling a user device on the move to utilize digital content" may refer to "providing a user device on the move with digital content", "outputting to a user device on the move digital content", "allowing a user device on the move to utilize digital content" and/or "enabling a user device on the move to present digital content".

Since the content selection system determines a current position and a current travel direction of the user device, a prevailing estimated location of the user device is established, as well as a prevailing estimated direction of travel thereof. The current position—which for instance may be based on global coordinates, based on a longitudinal positioning along e.g. a road, and/or based on a relative position—may, at least partly, be determined in any arbitrary manner, for instance with support from commonly known positioning techniques, such as global positioning techniques, and/or sensor techniques commonly provided. The current position may thus be established for instance by utilizing GPS position data and geographic map data such as provided by map data suppliers, commonly known Google maps, Apple maps and/or equivalents or successors thereof. Additionally or alternatively, other methods—such as e.g. triangulation—may be utilized. The current travel direction may be determined in a similar manner, for instance taking into account one or more previous determined or known positions of the user device. Moreover, the current position and/or current travel direction may be determined by functionality of the user device itself and/or for instance by functionality of a vehicle on-board which the user device may be carried, and subsequently be derived by—and/or provided to—the content selection system. Additionally or alternatively, the current position and/or the current travel direction may be derived from the intermediate system discussed above. Thus, the current position and/or current travel direction may be derived at a current instant in time; additionally and/or alternatively, a stored position value and/or stored travel direction value may be derived, e.g. from a database holding vehicle position values and/or vehicle travel direction values, which database for instance may be comprised in said intermediate system. "Current" may in this context refer to "essentially current" and/or "prevailing", whereas the expression "determining" a current position and a current travel direction, may refer to "deriving", "calculating", "accessing", "obtaining", "reading", "requesting", "receiving", "requesting and receiving", and/or "fetching" a current position and a current travel direction. Moreover, "position" may refer to "geographical position", "horizontal position", "estimated position", and/or "approximate position", whereas "travel direction" may refer to "horizontal travel direction", "travel direction parallel to the ground", "estimated travel direction", and/or "approximate travel direction". Furthermore, the expression "current position" may, for instance, refer to "prevailing position", "position at a current or prevailing point of time", and/or "position at an essentially current or essentially prevailing point of time", whereas "current travel direction" for instance may refer to "prevailing travel direction", "travel direction at a current or prevailing point of time", and/or "travel direction at an essentially current or essentially prevailing point of time". According to an example, the expression "determining a current position and a current travel direction of the user device", may refer to "determining a current position and a current travel direction of the vehicle".

Since the content selection system determines a current travel remainder for moving along a travel route from the current position to at least a first entity located ahead of the user device, based on a first digitally stored geographical location associated with the first entity, a respective remainder for moving—e.g. travelling—from the current user device position along a respective presumed travelable route to one or more entities is established taking into consideration at least the respective location(s) of the one or more entities. Accordingly, the travel remainder is established in view of a presumed travel route between the current user device position and the at least first entity, rather than in view of a straight line there between (unless no presumed travel route other than a straight line between the current user device position and the at least first entity can be presumed). The travel route may for instance be determined and/or approximated with support from the previously discussed map data and/or map data suppliers. The expression "travel route" may refer to "determined, estimated, approximated, presumed and/or assumed travel route". Moreover, "travel" route may refer to "travelable", "passable" and/or "drivable" route, whereas "moving" along a travel route in this context may refer to "travelling", "driving", "riding" and/or "walking" along a travel route. Determining whether an entity is located ahead of—rather than behind—the user device may be based on the determined current user device position and determined current travel direction.

The "travel remainder" may for instance be expressed as a time unit, such as an estimated time it may take to travel, drive and/or walk to the at least first entity from the determined current user device position, for instance specified in hours, minutes and/or seconds. Additionally or alternatively, the "travel remainder" may be expressed as a distance unit, such as an estimated travel, driving and/or walking distance to the at least first entity from the determined current user device position, for instance specified in miles, kilometres and/or meters. "Determining" a current travel remainder may refer to "calculating", "estimating", "accessing" and/or "deriving" a current travel remainder, whereas "based on" may refer to "taking into consideration" and/or "calculated based on". Moreover, "current" travel remainder may refer to "essentially current" and/or "prevailing" travel remainder, whereas digitally stored geographical location "associated with" the first entity may refer to digitally stored geographical location "tagged with", "related to", "linked with", "labelled to be associated with", and/or "categorized to be associated with" the first entity. The expression "digitally stored geographical location", may refer to "geographical location stored in digital data and/or digital map data", "digitally specified geographical location" and/or "digitally stored geographical position". The digitally stored geographical locations of the one or more entities may for instance reside in memory, such as commonly known in map data of a map data database, for instance in the user device's memory and/or in one or more external and/or remote data sources, such as in one or more clouds and/or one or more servers.

Since the content selection system compares the travel remainder to at least a first digitally stored maximum threshold value associated with the first entity, at least a first travel remainder is weighed against one or more maximum threshold values, for at least a first entity. The "maximum threshold value" may be expressed as a time unit, for instance specified in hours, minutes and/or seconds. Additionally or alternatively, the "maximum threshold value" may be expressed as a distance unit, for instance specified in miles, kilometres and/or meters. Which entities are selected for comparison may be arbitrarily selected; for instance entities are selected which are considered or determined to be within a region in a forward view of—or surrounding—the user device. An extension and/or width of such a region may for instance range from a few meters up to hundreds of kilometres, depending on the implementation and/or conditions at hand, e.g. memory capacity. "Comparing the travel remainder to" may refer to "considering the travel remainder in view of". Moreover, digitally stored maximum threshold value "associated with" the first entity, may refer to digitally stored maximum threshold value "tagged with", "related to", "linked with", "labelled to be associated with", and/or "categorized to be associated with" the first entity. The expression "digitally stored maximum threshold value", may refer to "maximum threshold value stored in digital data and/or a data table", "digitally specified maximum threshold value" and/or "digitally stored maximum threshold value". The digitally stored maximum threshold values of the one or more entities may for instance reside in memory such as in a data table, for instance in the user device's memory and/or in one or more external and/or remote data sources, such as in one or more clouds and/or one or more servers.

Since the content selection system enables a first piece of digital content associated with the first entity to be utilized by the user device, when the travel remainder is equal to or lower than the at least first maximum threshold value, digital content of the first entity is not made available to the user device until the travel remainder is determined—by the previous comparing action—to have a value equal to or lower than the at least first maximum threshold value. Accordingly, only digital content of entities determined to have—or to have had—maximum threshold values greater than the corresponding travel remainder, is enabled to be utilized—e.g. presented—by the user device. Thereby, a filter mechanism is introduced, according to which digital content of entities having maximum threshold values below the travel remainder, is prevented from being utilized by the user device. Accordingly, rather than allowing digital content of a potentially extensive amount of entities to be made available to the user device, merely digital content of a filtered amount of entities is enabled to be utilized by the user device. Thus, the user device—and subsequently the user thereof, e.g. an occupant of a vehicle on-board which the user device is carried—may be prevented from utilizing, e.g. being presented, digital content associated with potentially irrelevant entities, i.e. entities having respective maximum threshold values set lower than respective current travel remainder values. Moreover, since the respective maximum threshold values may vary from one entity to another, for instance depending on the characteristics, priorities and/or digital contents thereof, a maximum threshold value of one entity may differ from a maximum threshold value of another entity, for instance be set higher, thus enabling digital content of for instance a first entity to be enabled earlier than digital content of a second entity. Accordingly, even though one or more entities may be located essentially the same travel distance and/or travel time from the determined current user device position, i.e. have an essentially equal travel remainder, only digital content of those entities having maximum threshold values greater than the travel remainder, is enabled. The expression "enabling" a first piece of content, may refer to "providing", "allowing", "making available", "submitting", "supplying", "sending", "pushing" and/or "streaming" a first piece of content, whereas "to be utilized by" may refer to "to be stored by", "to be presented by", "to be used by" and/or "to be received by". Moreover, a first piece of content "associated with" the first entity, may refer to a first piece of content "tagged with", "related to", "linked with", "labelled to be associated with" and/or "categorized to be associated with" the first entity. Furthermore, "when" may in this context refer to "if" and/or "only when", whereas the expression "is equal to or lower than" may refer to "once has become equal to or lower than and/or "falls below". "Lower" may refer to "shorter".

Optionally, the digital content may comprise media content and the first piece of digital content comprise a first piece of media content associated with the first entity. Thereby, media content of one or more entities may be enabled to be utilized by the user device, when the respective current travel remainders to those entities fall below respective maximum threshold values. Accordingly, media content—such as e.g. curiosa, information and/or facts in audio, text, video, URL etc. format—associated with those entities may be made available for use by the user device, for instance for audible and/or visual presentation thereof. Thus, should the first entity be represented by an exemplifying tourist attraction, and the first piece of media content be represented by e.g. parking guidance for parking in the vicinity of said tourist attraction, then said parking guidance would be enabled for utilization—e.g. presentation—by the user device, when the current travel remainder to the tourist attraction fall below the at least first maximum threshold value.

Optionally, the digital content may comprise Point of Interest, POI, data and the first piece of digital content comprise first POI data associated with the first entity. The content selection system enabling the first piece of digital content to be utilized by the user device then comprises enabling—for instance displaying—at least a portion of the first POI data on a digital map on a display of the user device. Thereby, POI data of one or more entities may be enabled to be e.g. displayed by the user device, when the respective current travel remainders to those entities fall below respective maximum threshold values. Accordingly, at least a portion of POI data—such as e.g. POI icons in digital format—associated with those entities, may be made available for utilization e.g. visualized on a digital map on a display of the user device. Thus, should the first entity be represented by the exemplifying tourist attraction, and the first POI data comprise at least a POI icon, then said POI icon would be enabled for display by the user device, when the current travel remainder to the tourist attraction falls below the at least first maximum threshold value. "Point of Interest data" is intended to refer to Point of Interest data as commonly known in the art, which POI data for instance may be comprised in the previously discussed map data. Moreover, POI data "associated with" the first entity may refer to POI data "tagged with", "related to", "linked with", "labelled to be associated with" and/or "categorized to be associated with" the first entity. The expression of enabling "at least a portion" of the first POI data, may refer to enabling "one or more pieces of data" and/or "at least a POI icon", whereas "enabling" in this context may refer to "enabling displaying", "enabling presenting" and/or "making available". "Display" may refer to "at least a first display", "digital display" and/or "head-up display". Furthermore, the expression "digital map", onto which POI icons of entities may be mapped, may refer to a digital map comprising digital map data, as commonly known in the art. The digital map and/or the digital map data thereof may for instance be stored at any arbitrary location accessible by the content selection system and/or user device, and for instance be supported by previously discussed map data suppliers.

Optionally, determining a current travel remainder may comprise determining a current travel distance from the current position to the location of the at least first entity. The at least first maximum threshold value then comprises a first maximum threshold distance. Thereby, the travel remainder refers to a "travel distance", which for instance may range from a few meters up to hundreds of miles or more. Similarly, the at least first maximum threshold value then refers to a "first maximum threshold distance", which for instance may range from a few metres up to hundreds of miles. The expression "travel distance" may refer to "determined, estimated and/or approximated travel distance".

Optionally, the content selection system may further determine a current travel speed of the user device. Determining a current travel remainder then comprises determining a current travel time from the current position to the location of the at least first entity, additionally based on the travel speed. Moreover, the at least first maximum threshold value then comprises a first maximum threshold time. Thereby, the at least first maximum threshold value is represented by a first maximum threshold time, and a determined user device travel speed is utilized to establish an estimated travel time to reach the at least first entity from the determined current user device position. Subsequently, the first content is enabled, when the travel time is equal to or lower than the at least first maximum threshold time. The expression "travel time" may refer to "determined, estimated and/or approximated travel time". The "travel time" may for instance range from a few seconds up to several hours or more. Similarly, the "maximum threshold time" may for instance range from a few seconds up to several hours. The travel speed of the user device may be determined as commonly known in the art, and further for instance be derived from functionality of the user device and/or from a vehicle on-board which the user device is carried. According to an example, the "travel speed of the user device" may refer to the "travel speed of the vehicle on-board which the user device is carried". The expression "current" travel speed may refer to "essentially current", "prevailing", "current approximate" travel speed. Moreover, "current travel speed" may refer to "travel speed at a current or prevailing point of time", and/or "travel speed at an essentially current or essentially prevailing point of time". Moreover, the travel time may further be based on additional input which potentially may affect the travel time. For instance, the travel time may be based on additional input originating from map data, such as one or more speed limits, stop signs, traffic lights etc. along the presumed travel route. Additionally or alternatively, the additional input may originate from traffic information applicable for the presumed travel route, such as reported and/or identified accidents, traffic jams, roadworks, slippery roads etc. along the presumed travel route.

Optionally, the content selection system may determine, for one or more entities, respective one or more maximum threshold values, and furthermore store digitally the respective one or more maximum threshold value(s) to be associated with respective entity. Thereby, at least a first maximum threshold value may beforehand be defined for and/or set— e.g. in a data table—for at least a first entity, which at least first maximum threshold value may be adapted to suit for instance the location, region, characteristics, priority and/or digital contents etc. of the at least first entity. The one or more threshold values may potentially be modified, for instance automatically in view of affecting parameters, and/or manually by an operator.

Optionally, the content selection system may derive foresight conditions input comprising one or more time availability indicating parameters. The content selection system may then furthermore define a geographical limiting zone extending in front of the user device, based on the current position, the current travel direction, and at least a first time availability indicating parameter of the foresight conditions input. Moreover, the content selection system may then compare the limiting zone to the first geographical location. Enabling a first piece of digital content associated with the first entity to be utilized by the user device, when the travel remainder is equal to or lower than the at least first maximum threshold value, then comprises enabling a first piece of digital content associated with the first entity to be utilized by the user device, when the travel remainder is equal to or lower than the at least first maximum threshold value and the first location is within the limiting zone. Thereby, since the content selection system may derive foresight conditions input comprising one or more time availability indicating parameters, conditions indicating availability of time and/or foresight is obtained. That is, said one or more time availability indicating parameters—and subsequently the foresight conditions input—reflect parameters affecting the availability of time for the moving user device, i.e. how much time the user device on the move may have in store. The foresight conditions input may be obtained from computer memory either stored e.g. in the user device's memory and/or external data sources, such as in one or more clouds and/or one or more servers e.g. holding map data, and/or from e.g. a navigation system associated with the user device or a vehicle on-board which the user device is carried. The expression "foresight conditions input" may refer to "time availability indicating input", "time availability affecting input" and/or "priming input", whereas "input" for instance may refer to "data", "value(s)" and/or "information". Moreover, deriving "foresight conditions input" may refer to deriving "digital foresight conditions input", whereas "deriving" foresight conditions input may refer to "accessing", "obtaining", "reading", "requesting", "receiving", "requesting and receiving", "fetching", "calculating", "defining", "estimating" and/or "determining" foresight conditions input. Furthermore, "time availability indicating parameters" may refer to "time related parameters", "time availability affecting parameters" and/or "time availability restricting parameters", and may further refer to "pieces of time availability indicating data".

Moreover, thereby, since the content selection system may define a geographical limiting zone extending in front of the user device, based on the current position, the current travel direction, and at least a first time availability indicating parameter of the foresight conditions input, an imaginary restricting area extending ahead of the user device is calculated in view of one or more parameters of the foresight conditions input and the current position and travel direction of the user device. The geographical limiting zone may be of any arbitrary shape or size given the restrictions pertinent the current position, travel direction and at least first time availability indicating parameter, and the calculation(s) behind defining the geographical limiting zone may vary. An extension of the limiting zone may for instance range from a few tens of metres up to hundreds of kilometres, depending on the restricting foresight conditions input. Similarly, a maximum width of the limiting zone may for instance range from a few tens of metres up to tens of kilometres, depending on said restricting foresight conditions input. "Defining" a geographical limiting zone may refer to "determining" and/or "calculating" a geographical limiting zone, whereas "zone" may refer to "area", "region", "polygon" and/or "sector". Moreover, "geographical limiting zone" may refer to "fictive, hypothetical and/or imaginary geographical limiting zone", whereas "based on" in this context may refer to "taking into consideration", "in view of", "utilizing", "calculated based on" and/or "by calculation using as input". Furthermore, the expression of a limiting zone "extending" in front of the user device, may refer to a limiting zone "located" and/or "positioned" in front of the user device. Moreover, a limiting zone "extending in front of the user device", may refer to a limiting zone "extending in the travel direction of the user device", "extending in a direction of a road along which the user device is determined to move", and/or "originating in the determined user device position and extending in front of the user device".

Moreover, thereby, since the content selection system may compare the limiting zone to a first digitally stored geographical location of at least a first entity, the positions of one or more entities are considered in view of the determined limiting zone. "Comparing" the limiting zone may refer to "comparing one or more boundary values of", and/or "considering in view of" the limiting zone. Furthermore, location "of" at least a first entity, may refer to location "associated with", "tagged with", "related to", "linked with", "labelled to be associated with" and/or "categorized to be associated with" at least a first entity.

Moreover, thereby, since the content selection system may enable a first piece of digital content associated with the first entity to be utilized by the user device, when the travel remainder is equal to or lower than the at least first maximum threshold value and the first location is within the limiting zone, digital content of the first entity is not made available to the user device until the travel remainder is determined to have a value equal to or lower than the at least first maximum threshold value and the geographical location of the first entity is determined to fall within the limiting zone. Accordingly, only digital content of entities determined to have—or to have had—maximum threshold values greater than the corresponding travel remainder and determined to have—or to have had—geographical locations within the limiting zone, is enabled to be utilized—e.g. presented—by the user device. Thereby, a yet more sophisticated filter mechanism is introduced, according to which digital content of entities having maximum threshold values below the travel remainder and/or geographical locations beyond the limiting zone, is prevented from being utilized by the user device.

Moreover, as a result of that the optional time availability parameters may be dynamic, the limiting zone may change dynamically. That is, since the optional limiting zone varies with the one or more time availability indicating parameters, said limiting zone may range from being relatively limited to being relatively extensive. Thus, entities being determined to have geographical locations beyond a first limiting zone given a first set of time availability parameters, may be determined to have geographical locations which fall within an alternative limiting zone given an alternative set of time availability parameters. Accordingly, a limiting zone applicable for a user device being carried by e.g. a pedestrian, may be significantly more limited than a limiting zone applicable for a user device on-board a vehicle travelling along a highway. In the former scenario, the pedestrian may be interested in digital content of entities in close vicinity thereof rather than digital content of entities lying further ahead, and an extension and/or width of the limiting zone may thus be defined to be relatively limited, and/or the limiting zone furthermore defined to originate in the determined user device position. On the contrary, in the latter scenario, the vehicle occupant may be interested in digital content of entities lying further ahead and/or entities lying relatively far away from a road along which the vehicle may be travelling, and the limiting zone may thus be defined to be relatively extensive and/or relatively wide. The expression "is within" the limiting zone may refer to "once has come within", "falls within", "is within or on a boundary of" and/or "reaches" the limiting zone.

Furthermore, the optional limiting zone may for instance be defined such that an imaginary plotted view thereof is represented by a sector extending in front of the user device enclosed by a first radius and a second radius of a circle. An angle of the sector and/or a length of said radii is then based on the at least first time availability indicating parameter of the foresight conditions input. Thereby, the limiting zone is represented by a fictive circle sector restricted by the determined position and travel direction of the user device as well as one or more time availability indicating parameters. Accordingly, a feasible and efficient approach is presented with regards to how to define the limiting zone. The length of the radii may take on any arbitrary feasible value considered appropriate given the current circumstances, and may for instance range from a few tens of metres up to hundreds of kilometres depending on the at least first time availability indicating parameter. The "length" of the radii may refer to the previously discussed "extension" of the limiting zone. Similarly, the angle of the sector may take on any arbitrary feasible value considered appropriate given the current circumstance, and may range for instance from a few degrees up to 180 degrees depending on the at least first time availability indicating parameter. Said angle may even, according to an example, range up to close to 360 degrees, for instance should a determined travel speed of the user device be essentially equal to—or close to—zero. The expression "imaginary" plotted view may refer to "fictive" and/or "hypothetical" plotted view, whereas "plotted view" may refer to "projection". Moreover, "based on" may in this context refer to "takes into consideration", "utilizes", "calculated based on" and/or "is calculated using as input". According to an example, the determined current user device position may represent a circle centre of said circle. Thereby, the limiting zone originates in said circle centre. According to another example, the limiting zone may further be defined such that the sector further is enclosed by an arc between the first radius and the second radius. Thereby, the arc represents a distal boundary of the limiting zone. A length of the arc may refer to the previously discussed "maximum width" of the limiting zone.

Moreover, the optional limiting zone may be defined such that the sector is asymmetrically arranged along an elongation of a fictive line in the travel direction. Optionally, however, the limiting zone may be defined such that the sector is symmetrically arranged along an elongation of a fictive line in the travel direction. Thereby, the travel direction of the user device dictates the direction of the sector, i.e. said travel direction dictates the direction of the limiting zone, in that said sector and subsequently said limiting zone is symmetrically arranged along a hypothetical line extending in the travel direction. Additionally or alternatively, the limiting zone may be defined such that the sector is asymmetrically arranged along a section of a road along which the user device is determined to move. Optionally, however, the limiting zone may be defined such that the sector is symmetrically arranged along a section of a road along which the user device is determined to move. Thereby, the direction of the road section along which the user device is moving dictates the direction of the sector, i.e. said direction of the road section dictates the direction of the limiting zone. "Symmetrically" may refer to "essentially symmetrically", whereas "fictive" may refer to "imaginary" and/or hypothetical". Moreover, the expression of that the sector is "symmetrically arranged along", may refer to that the sector is "arranged such that said sector and/or the angle thereof is split in two equal, or essentially equal, halves by". The expression "elongation of a fictive line" in the travel direction may refer to "a fictive line extending" in the travel direction, whereas "determined to move" may refer to "estimated to move", "determined to move in parallel to the ground" and/or "determined to horizontally move". Determination of the road section along which the user device is moving may be determined as commonly known in the art, for instance with support from previously discussed map data and/or map data suppliers.

The one or more optional time availability indicating parameters may comprise a current travel speed of the user device. Thereby, the optional limiting zone is defined taking into account at least the travel speed of the user device, and the limiting zone may accordingly vary essentially therewith, potentially with a delay. In order to provide an adequate filter mechanism, the limiting zone may for instance be defined to have a relatively limited extension should the travel speed be relatively slow, and to have a relatively extensive extension should the travel speed be relatively high. Additionally or alternatively, the one or more time availability indicating parameters may comprise a speed limit of a road along which the user device is determined to move and/or a presumed upcoming road. Additionally or alternatively, the one or more time availability indicating parameters may comprise an estimated time to a specified destination for the user device. The "specified destination" may for instance refer to a destination—e.g. a final destination—specified and/or predetermined in the navigation system, whereas "estimated time" may refer to "estimated remaining time". Additionally or alternatively, the one or more time availability indicating parameters may comprise a restricting time pertinent an upcoming planned activity specified in a calendar associated with the user device. The expression "restricting time pertinent an upcoming planned activity" may for instance refer to a limiting point of time at which a planned activity—such as a meeting—is due, whereas "specified in a calendar" may refer to "derived from, noted in, added to and/or entered in a digital calendar". Moreover, "calendar associated with" the user device may refer to "calendar electronically associated with, linked with, related to, accessible from, comprised in and/or synchronising with" the user device. Additionally or alternatively, the one or more parameters may comprise a type of carrier on which the user device is carried. The type of carrier on which the user device is carried may be determined in any arbitrary manner, for instance by detecting a horizontal motion behaviour of the user device and subsequently determining and/or estimating said carrier. Additionally or alternatively, the type of carrier may be specified—for instance by a user of said user device—and subsequently be derived by the content selection system.

According to a second aspect of embodiments herein, the object is achieved by a content selection system adapted for in a timed manner enabling a user device on the move to utilize digital content associated with one or more entities located ahead of the user device. The content selection system comprises a conditions determining unit adapted for determining a current position and a current travel direction of the user device. The content selection system further comprises a travel remainder determining unit adapted for determining a current travel remainder for moving along a travel route from the current position to at least a first entity located ahead of the user device, based on a first digitally stored geographical location associated with the first entity. Moreover, the content selection system comprises a data comparing unit adapted for comparing the travel remainder to at least a first digitally stored maximum threshold value associated with the first entity. The content selection system furthermore comprises a content enabling unit adapted for enabling a first piece of digital content associated with the first entity to be utilized by the user device, when the travel remainder is equal to or lower than the at least first maximum threshold value.

Optionally, the digital content may comprise media content and the first piece of digital content comprise a first piece of media content associated with the first entity.

Moreover, optionally, the digital content may comprise Point of Interest, POI, data and the first piece of digital content comprise first POI data associated with the first entity. The content enabling unit is then further adapted for enabling at least a portion of the first POI data on a digital map on a display of the user device.

Furthermore, optionally, the travel remainder determining unit may further be adapted for determining a current travel distance from the determined current position to the location of the at least first entity. The at least first maximum threshold value then comprises a first maximum threshold distance.

Optionally, the conditions determining unit may further be adapted for determining a current travel speed of the user device, and the travel remainder determining unit further be adapted for determining a current travel time from the determined current position to the location of the at least first entity, additionally based on the travel speed. The at least first maximum threshold value then comprises a first maximum threshold time.

Optionally, the content selection system may further comprise thresholds defining unit adapted for defining, for one or more entities, respective one or more maximum threshold values, and a storing unit adapted for storing digitally the respective one or more maximum threshold value(s) to be associated with respective entity.

Moreover, optionally, the content selection system may comprise a time availability deriving unit adapted for deriving foresight conditions input comprising one or more time availability indicating parameters; and a limiting zone defining unit adapted for defining a geographical limiting zone extending in front of the user device, based on determined current position, the determined current travel direction, and at least a first time availability indicating parameter of the foresight conditions input. The data comparing unit is then further adapted for comparing the limiting zone to the first geographical location; and the content enabling unit is then further adapted for enabling a first piece of digital content associated with the first entity to be utilized by the user device, when the travel remainder is equal to or lower than the at least first maximum threshold value and the first location is within the limiting zone.

Similar advantages as those mentioned in the foregoing in relation to the first aspect correspondingly apply to the second aspect, which is why these advantages are not further discussed.

According to a third aspect of embodiments herein, the object is achieved by a user device comprising at least a portion of the content selection system discussed above, i.e. comprising at least the thresholds defining unit, the storing unit, the travel remainder determining unit, the data comparing unit, the time availability deriving unit, the limiting zone defining unit and/or the content enabling unit. Again, similar advantages as those mentioned in the foregoing in relation to the first aspect correspondingly apply to the third aspect, which is why these advantages are not further discussed.

According to a fourth aspect of embodiments herein, the object is achieved by a computer program product comprising a computer program containing computer program code means arranged to cause a computer or a processor to execute the steps of the content selection system discussed above, stored on a computer-readable medium or a carrier wave. Yet again, similar advantages as those mentioned in the foregoing in relation to the first aspect correspondingly apply to the fourth aspect, which is why these advantages are not further discussed.

BRIEF DESCRIPTION OF THE DRAWINGS

The various aspects of the non-limiting embodiments of the invention, including particular features and advantages, will be readily understood from the following detailed description and the accompanying drawings, in which:

FIG. 5 illustrates a schematic overview of an exemplifying data table according to embodiments of the disclosure;

DETAILED DESCRIPTION

Figure 1:
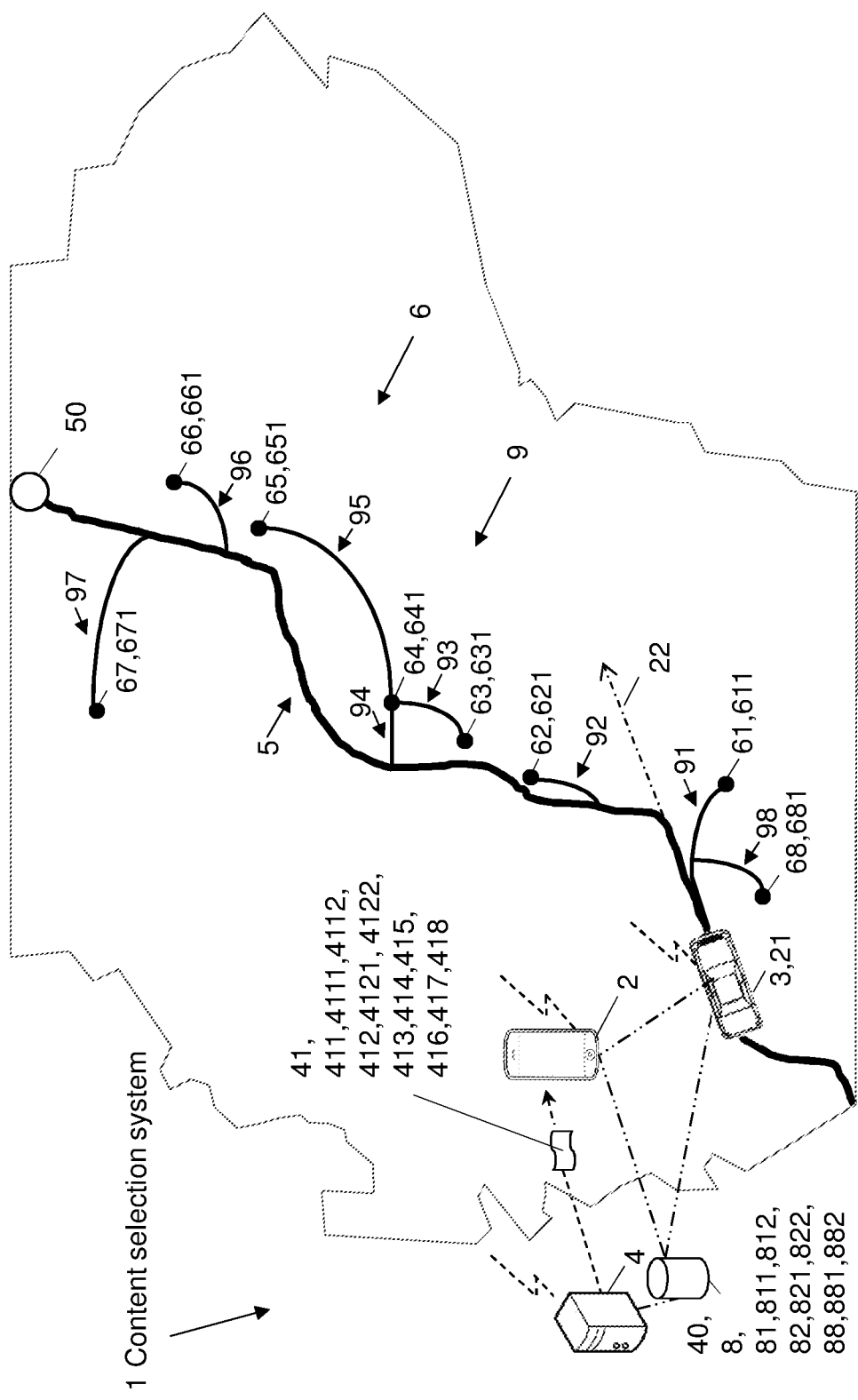
FIG. 1 illustrates a schematic overview of an exemplifying content selection system according to embodiments of the disclosure.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to in a timed manner enabling a user device on the move to utilize digital content associated with one or more entities located ahead of the user device, there will be disclosed that the inventive concept enables a user device—and subsequently a user thereof, e.g. an occupant of a vehicle on-board which the user device is carried—to be prevented from utilizing, e.g. being presented, digital content associated with potentially irrelevant entities.

Referring now to the figures and FIG. 1 in particular, there is depicted a schematic overview of an exemplifying content selection system 1 according to embodiments of the disclosure. The content selection system 1, which will be described in further detail later on in this description, may at least partly be comprised in a user device 2, which in the exemplifying embodiment is carried on-board a vehicle 3. The content selection system 1 may furthermore be at least partly comprised in at least a first remote server 4 which may be adapted to communicate wirelessly with the user device 2. The vehicle 3—and subsequently the user device 2—which either or both may support navigating abilities, has a current position 21, and a current travel direction 22. The vehicle 3—and subsequently the user device 2—is travelling along an exemplifying road 5, optionally toward a specified final destination 50, along which road 5 an exemplifying plurality of entities 6 is spread out—a first entity 61 having a first geographical location 611, a second entity 62 having a second geographical location 621, a third entity 63 having a third geographical location 631, a fourth entity 64 having a fourth geographical location 641, a fifth entity 65 having a fifth geographical location 651, a sixth entity 66 having a sixth geographical location 661, a seventh entity 67 having a seventh geographical location 671 and an eighth entity 68 having an eighth geographical location 681. The first entity 61 is here represented by an exemplifying tourist attraction.

The content selection system 1, the user device 2, the vehicle 3, and/or the one or more servers 4 may furthermore comprise an optional data table 40 comprising digital content 41, such as a first piece of digital content 411 associated with the first entity 61, a second piece of digital content 412 associated with the second entity 62, a third piece of digital content 413 associated with the third entity 63, a fourth piece of digital content 414 associated with the fourth entity 64, a fifth piece of digital content 415 associated with the fifth entity 65, a sixth piece of digital content 416 associated with the sixth entity 66, a seventh piece of digital content 417 associated with the seventh entity 67 and an eighth piece of digital content 418 associated with the eighth entity 68. The digital content 41 may comprise POI data associated with respective entity 6. The first piece of digital content 411 may thus comprise first POI data 4111 associated with the first entity 61, the second piece of digital content 412 comprise second POI data 4121 associated with the second entity 62, etc. The first POI data 4111 is here represented by at least a first POI icon indicating that the first entity 61 is a tourist attraction. Additionally or alternatively, the digital content 41 may comprise media content associated with respective entity 6. The first piece of digital content 411 may thus in this latter scenario comprise a first piece of media data 4112 associated with the first entity 61, the second piece of digital content 412 comprise a second piece of media data 4122 associated with the second entity 62, etc. The first piece of media data 4112 is here represented by parking information and/or curiosa associated with the exemplifying tourist attraction 61.

Each respective entity 6 is here associated with one or more respective maximum threshold values 8, which threshold values 8 may differ from one another, and which will be discussed in further detail later on. The threshold values 8 may for instance be digitally stored in a memory of the user device 2 and/or in the one or more servers 4; for instance in the optional data table 40 discussed above. At least a first maximum threshold value 81 is associated with the first entity 61, at least a second maximum threshold value 82 is associated with the second entity 62, etc., and at least an eight maximum threshold value 88 is associated with the eighth entity 68. The at least first maximum threshold value 81 may optionally comprise a first maximum threshold distance 811; additionally or alternatively, the at least first maximum threshold value 81 may comprise a first maximum threshold time 812. Similarly, the at least second maximum threshold value 82 may optionally comprise a second maximum threshold distance 821; additionally or alternatively, the at least second maximum threshold value 82 may comprise a second maximum threshold time 822, etc. Moreover, similarly, the at least eighth maximum threshold value 88 may optionally comprise an eighth maximum threshold distance 881; additionally or alternatively, the at least eighth maximum threshold value 88 may comprise an eighth maximum threshold time 882.

Further depicted in FIG. 1 is exemplifying respective estimated travel routes 9 between the current user device position 21 and each respective entity 6. Thus, shown in FIG. 1 is—from the current user device position 21—a first travel route 91 to the first entity 61, a second travel route 92 to the second entity 62, a third travel route 93 to the third entity 63, a fourth travel route 94 to the fourth entity 64, a fifth travel route 95 to the fifth entity 65, a sixth travel route 96 to the sixth entity 66, a seventh travel route 97 to the seventh entity 67, and an eighth travel route 98 to the eighth entity 68. In the shown exemplifying embodiment, a current travel remainder for moving along the first travel route 91 from the current user device position 21 to the first entity 61, is equal to or lower than the first maximum threshold value 81. Similarly, a current travel remainder for moving along the second travel route 92 from the current user device position 21 to the second entity 62, is equal to or lower than the second maximum threshold value 82; a current travel remainder for moving along the sixth travel route 96 from the current user device position 21 to the sixth entity 66, is equal to or lower than the sixth maximum threshold value 86; and a current travel remainder for moving along the eighth travel route 98 from the current user device position 21 to the eighth entity 68, is equal to or lower than the eights maximum threshold value 88. The remaining exemplified entities 6, however, have respective current travel remainders which are not equal to or lower than their respective threshold values 8. That is, a current travel remainder for moving along the third travel route 93 from the current user device position 21 to the third entity 63, is greater than the third maximum threshold value 83; a current travel remainder for moving along the fourth travel route 94 from the current user device position 21 to the fourth entity 64, is greater than the fourth maximum threshold value 84; a current travel remainder for moving along the fifth travel route 95 from the current user device position 21 to the fifth entity 65, is greater than the fifth maximum threshold value 85; and a current travel remainder for moving along the seventh travel route 97 from the current user device position 21 to the seventh entity 67, is greater than the seventh maximum threshold value 87.

Figure 2:
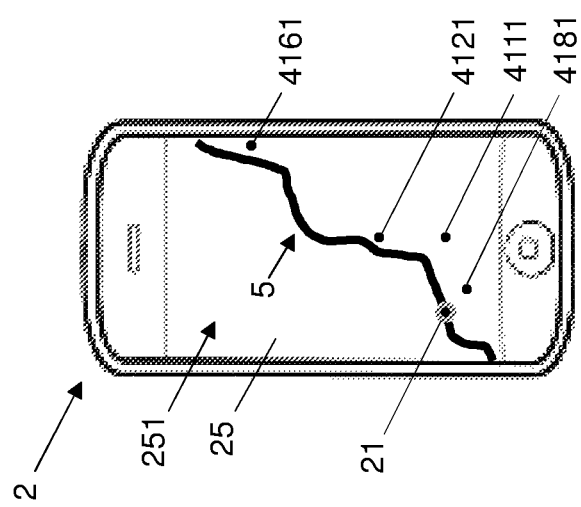
FIG. 2 illustrates a schematic overview of an exemplifying digital map view according to embodiments of the disclosure, which may result from the conditions of FIG. 1.

FIG. 2 illustrates a schematic overview of an exemplifying digital map view according to embodiments of the disclosure, which may result from the conditions of FIG. 1. The digital map view illustrates a digital map 251 on a display 25 of the user device 2. Shown on the digital map 251 is the current vehicle position 21 on the exemplifying road 5 along which the vehicle 3—and subsequently the user device 2—is travelling. The digital map 251 may further support POI data associated with entities 6, such as POI icons. Enabled, here displayed, in the exemplifying embodiment, is POI data associated with entities 6 to which corresponding travel remainder is equal to or lower than the respective maximum threshold value 8. Enabled—subsequently displayed—is thus the first POI data 4111 associated with the first entity 61, the second POI data 4121 associated with the second entity 62, sixth POI data 4161 associated with the sixth entity 66, and eighth POI data 4181 associated with the eighth entity 68. It may be noted that POI data associated with respective third, fourth, fifth, and seventh entities 63, 64, 65, 67 not is enabled/displayed.

Figure 3:
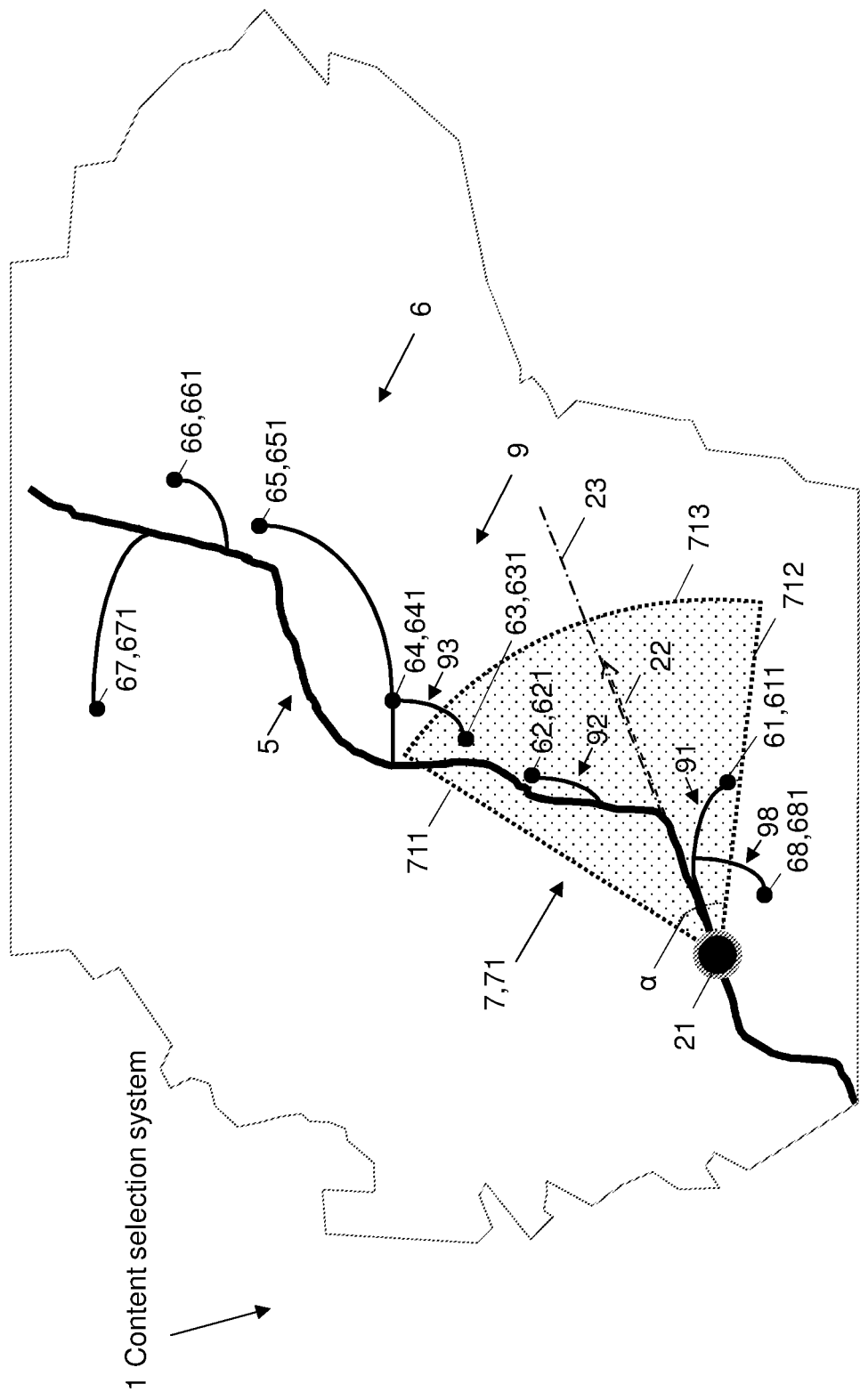
FIG. 3 illustrates a schematic overview of an exemplifying imaginary view according to embodiments of the disclosure, when additionally an optional limiting zone is applied.

FIG. 3 illustrates a schematic overview of an exemplifying imaginary view according to embodiments of the disclosure, when additionally an optional limiting zone 7 is applied. The limiting zone 7 extends in front of the user device 2. In the shown embodiment of FIG. 3, the imaginary plotted view of the limiting zone 7 is represented by a sector 71 extending in front of the user device 2 enclosed by a first radius 711 and a second radius 712 of a circle, and here further an arc 713. The sector 71 has an angle α. The sector 71 may for instance be symmetrically arranged along an elongation of a fictive line 23 in the travel direction 22; additionally or alternatively, the sector 71 may for instance be symmetrically arranged along a section of a road 5 along which the user device 2 is determined to move. Here, the limiting zone 7—subsequently the sector 71—originates in the current user device position 21, whereby said user device position 21 represents a circle center of the sector 71. It may be noted that according to alternative embodiment, the limiting zone 7—subsequently the sector 71—may originate a distance ahead of the current user device position 21. In the shown exemplifying embodiment, the first, second and third entities 61, 62, 63 have respective geographical locations 611, 621, 631 within the limiting zone 7, whereas the fourth, fifth, sixth, seventh and eighth entity 64, 65, 66, 67, 68 have respective geographical locations 641, 651, 661, 671, 681 situated beyond the limiting zone 7.

Figure 4:
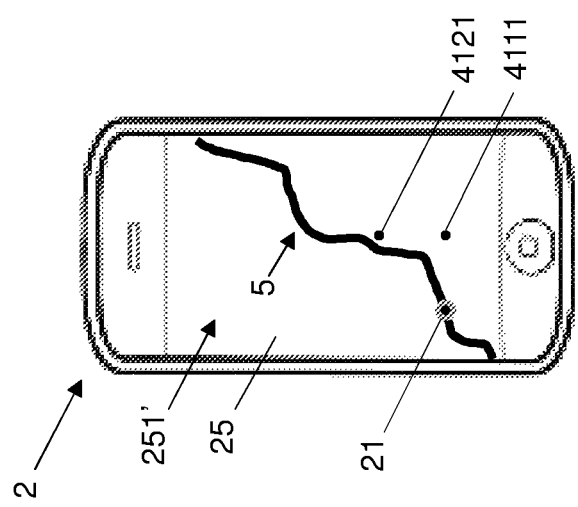
FIG. 4 illustrates a schematic overview of an exemplifying digital map view according to embodiments of the disclosure, which may result from additionally applying the limiting zone of FIG. 3.

FIG. 4 illustrates a schematic overview of an exemplifying digital map view according to embodiments of the disclosure, which may result from additionally applying the limiting zone 7 of FIG. 3. The digital map view illustrates a digital map 251' on the display 25 of the user device 2. Shown on the digital map 251' is the current vehicle position 21 on the exemplifying road 5 along which the vehicle 3—and subsequently the user device 2—is travelling. The digital map 251' may further support POI data associated with entities 6, such as POI icons. Enabled, here displayed, in the exemplifying embodiment is thus—from additionally implementing the limiting zone 7, i.e. the sector 71—merely the first POI data 4111 associated with the first entity 61 and the second POI data 4121 associated with the second entity 62. It may be noted that when additionally applying the limiting zone 7 of FIG. 3, in addition to POI data associated with respective third, fourth, fifth and seventh entities 63, 65, 65, 67 not being enabled/displayed, now is additionally POI data 4161, 4181 associated with respective sixth and eighth entities 66, 68 not enabled/displayed, since the respective geographical locations 661, 681 of said entities 66, 68 fall outside the limiting zone 7. It may further be noted that although the geographical location 631 is within the limiting zone 7, POI data associated with the third entity 63 is not enabled/displayed, since the current travel remainder for moving along the third travel route 93 from the current user device position 21 to the third entity 63, is greater than the third maximum threshold value 83.

FIG. 5 illustrates a schematic overview of the exemplifying data table 40 according to embodiments of the disclosure. The shown data table 40, or a similar arbitrarily arranged data table, matrix and/or set, may be arbitrarily stored in memory, for instance as previously discussed be comprised in the content selection system 1, the user device 2, the vehicle 3, the one or more servers 4, and/or one or more clouds, and/or be distributed between one or more of these. The data table 40 may hold information and/or posts on entities 6, and/or mapped entities corresponding to the physical entities 6. Moreover, the data table 40 may hold information and/or posts on locations 601 of entities 6, or mapped locations corresponding to and/or representing physical locations 601. Although not shown in FIG. 5, the exemplifying data table 40 may furthermore hold additional information associated with entities 6, such as further characteristics, attributes, priorities etc. thereof. The data table 40 exemplifies how digital content 41 may be associated with respective entity 6, how geographical locations 601 may be associated with respective entity 6, and furthermore how maximum threshold values 8 may be associated with respective entity 6. Shown in data table 40 is thus how the first location 611, the first POI data 4111 and/or the first piece of media content 4112—or pointers thereto—may be associated with the first entity 61. Similarly shown is further how the second location 621, the second POI data 4121 and/or the second piece of media content 4122—or pointers thereto—may be associated with the second entity 62, etc. Moreover, thus further shown in data table 40 is how the at least first threshold value 81—e.g. the at least first maximum threshold distance 811 and/or the at least first maximum threshold time 812—or pointers thereto, may be associated with the first entity 61. Similarly shown is further how the at least second threshold value 82—e.g. the at least second maximum threshold distance 821 and/or the at least second maximum threshold time 822—or pointers thereto, may be associated with the second entity 62, etc.

Figure 6:
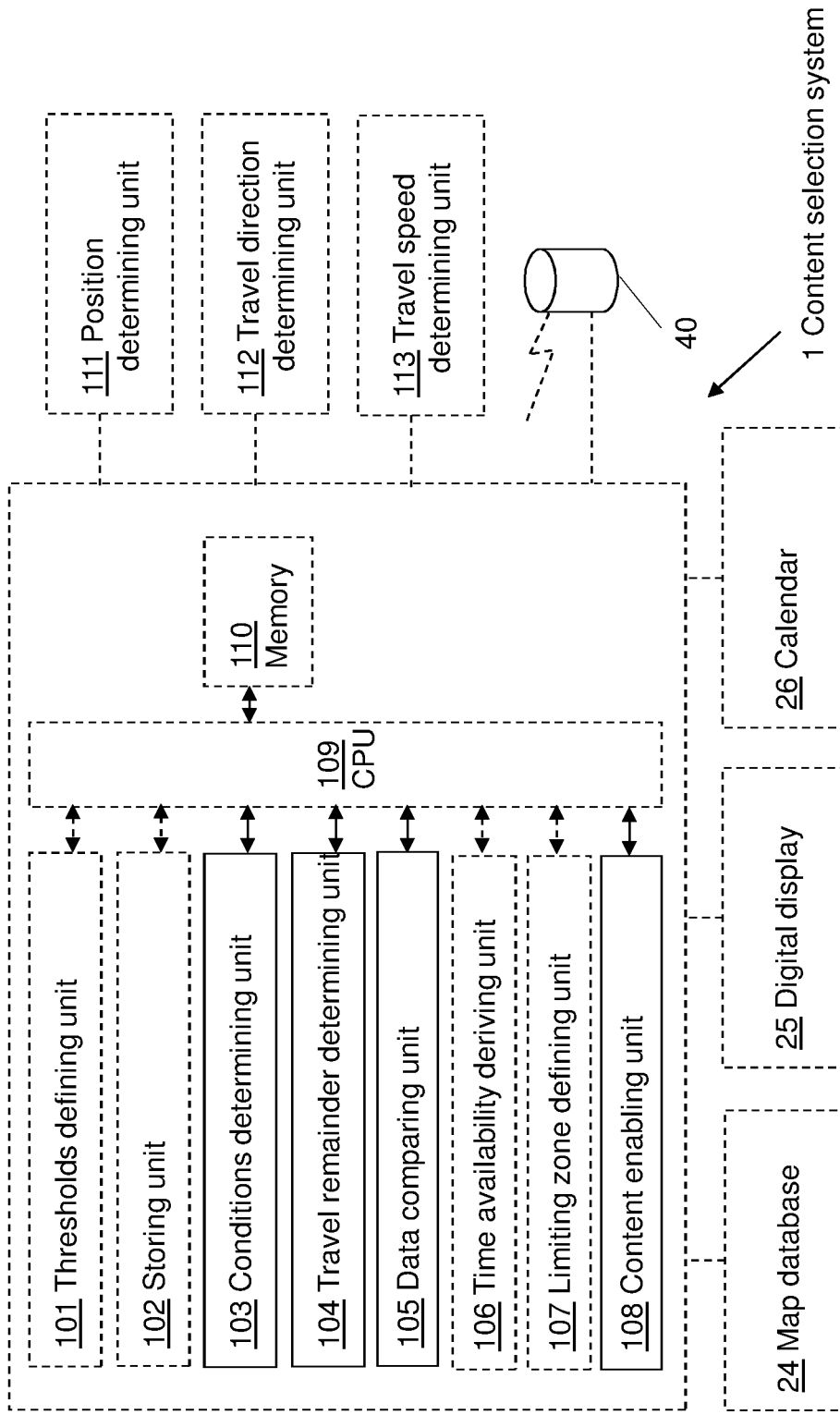
FIG. 6 illustrates a schematic block diagram illustrating an exemplifying content selection system according to embodiments of the disclosure.

As further shown in FIG. 6, which depicts a schematic block diagram illustrating an exemplifying content selection system 1 according to embodiments of the disclosure, the content selection system 1 is, as previously mentioned in conjunction with FIG. 1, adapted for in a timed manner enabling a user device 2 on the move to utilize digital content 41 associated with one or more entities 6 located ahead of the user device 2. The content selection system 1 comprises a conditions determining unit 103, a travel remainder determining unit 104, a data comparing unit 105 and a content enabling unit 108, all of which will be described in further detail below. The content selection system 1 may further comprise a thresholds defining unit 101, a storing unit 102, a time availability deriving unit 106 and/or a limiting zone defining unit 107, all of which in a similar manner will be described in further detail below.

Furthermore, the embodiments herein for in a timed manner enabling a user device 2 on the move to utilize digital content 41 associated with one or more entities 6 located ahead of the user device 2, may be implemented through one or more processors, such as a processor 109, here denoted CPU, together with computer program code for performing the functions and actions of the embodiments herein. Said program code may also be provided as a computer program product, for instance in the form of a data carrier carrying computer program code for performing the embodiments herein when being loaded into the content selection system 1. One such carrier may be in the form of a CD ROM disc. It is however feasible with other data carriers such as a memory stick. The computer program code may furthermore be provided as pure program code on a server and downloaded to the content selection system 1. The content selection system 1 may further comprise a memory 110 comprising one or more memory units. The memory 110 may be arranged to be used to store e.g. information, and further to store data, configurations, schedulings, and applications, and for instance data relating to entities 6, their respective locations 601, maximum threshold values 8 of said entities 6, digital content 41 of said entities 6 and/or map data, to perform the methods herein when being executed in the content selection system 1. Furthermore, one or more of said units 101, 102, 103, 104, 105, 106, 107, 108, the optional processor 109, and/or the optional memory 110, may for instance be implemented in the user device 2, in one or more nodes e.g. ECUs of the vehicle 3, in the one or more servers 4, and/or in one or more clouds, and/or be distributed among one or more thereof. A potential distribution may be arbitrary selected as considered suitable. According to an alternative example, the content selection system 1 may be represented by a plug-in solution, such that said content selection system 1 at least partly is implemented on for instance a dongle. In that manner, an aftermarket solution may be provided to any arbitrary user device 1 and/or vehicle 2 suitable. Those skilled in the art will also appreciate that one or more of said units 101, 102, 103, 104, 105, 106, 107, 108 may refer to a combination of analog and digital circuits, and/or one or more processors configured with software and/or firmware, e.g. stored in a memory such as the memory 110, that when executed by the one or more processors such as the processor 109 perform as will be described in more detail below. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Further illustrated in FIG. 6 is an exemplifying optional position determining unit 111 adapted to determine, store and/or provide a current position of the user device 2, an optional travel direction determining unit 112 adapted to determine, store and/or provide a current travel direction 22 of the user device 2, and an optional travel speed determining unit 113 adapted to determine, store and/or provide a current travel speed of the user device 2. The position determining unit 111, the travel direction determining unit 112 and/or the travel speed determining unit 113 may respectively be comprised in for instance the user device 2 and/or the vehicle 3, and further be adapted to communicate directly—or indirectly—with the content selection system 1. Further shown is the data table 40, and a map database 24 comprising map data, which map database 24 may be comprised in the content selection system 1, the user device 2, the vehicle 3, the one or more servers 4, and/or in one or more clouds. Additionally is the digital display 25 of the user device 2 illustrated, as well as a calendar 26 associated with the user device 2.

Figure 7:
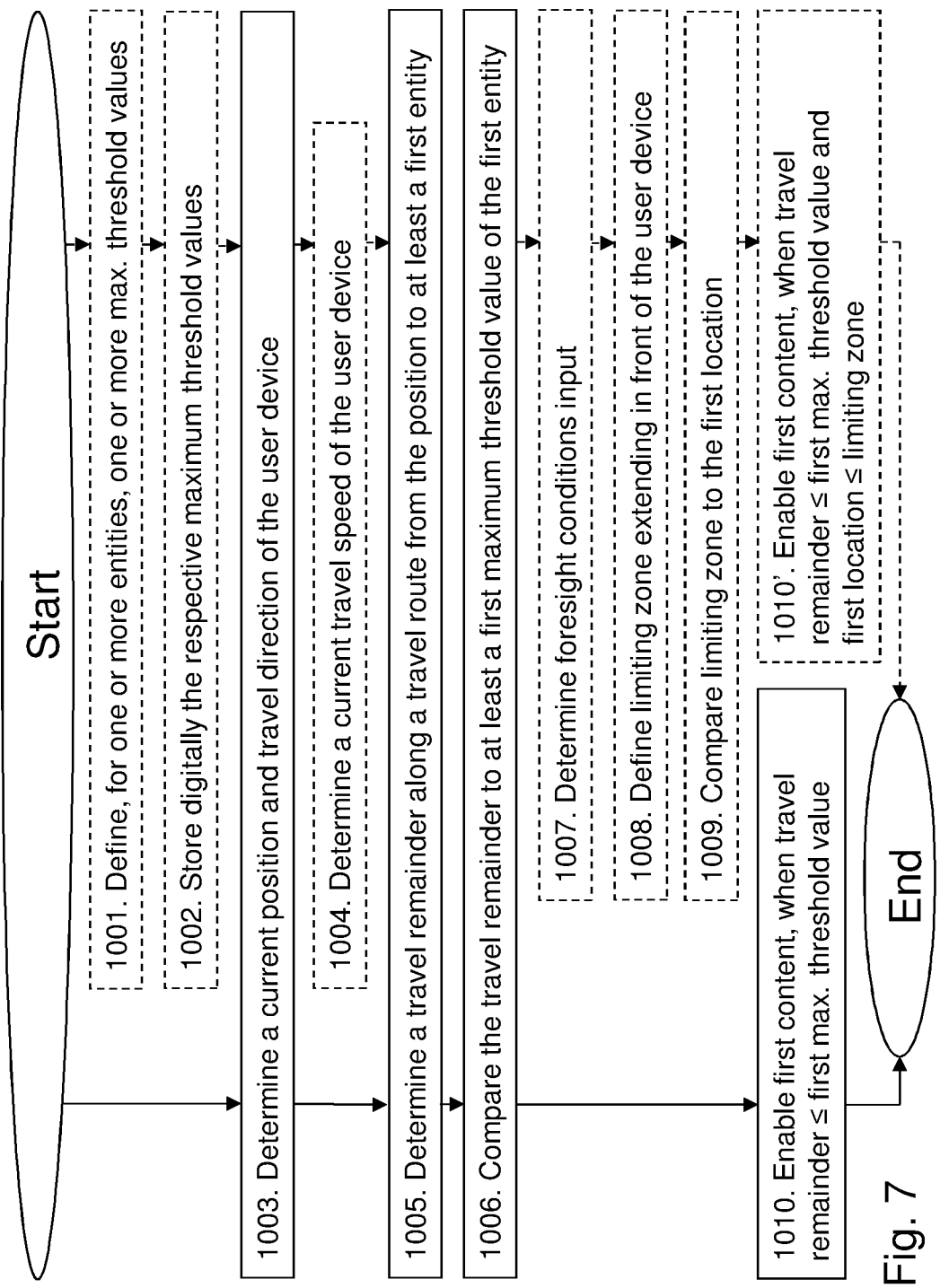
FIG. 7 is a flowchart depicting an exemplifying method performed by a content selection system according to embodiments of the disclosure.

FIG. 7 is a flowchart depicting an exemplifying method performed by the content selection system 1 according to embodiments of the disclosure. The content selection system 1 is for in a timed manner enabling a user device 2 on the move to utilize digital content 41 associated with one or more entities 6 located ahead of the user device 2. The exemplifying method, at least part of which may be repeated continuously, periodically or on demand, comprises the following actions discussed with support from FIGS. 1-6. The actions may be taken in any suitable order, and/or one or more actions may even be performed simultaneously where applicable. For instance, Action 1003 and optional Action 1002 may be performed essentially simultaneously, and/or in an alternative order. Moreover, for instance, Actions 1005-1006 and optional Actions 1007-1009 may be performed essentially simultaneously, and/or in an alternative order.

Action 1001

In optional Action 1001, the content selection system 1 may define, for one or more entities 6, respective one or more maximum threshold values 8. Correspondingly, the thresholds defining unit 101 may be adapted for defining, for one or more entities 6, respective one or more maximum threshold values 8.

Action 1002

In optional Action 1002, the content selection system 1 may store digitally the respective one or more maximum threshold value(s) 8 to be associated with respective entity 6. Correspondingly, the storing unit 102 may be adapted for storing digitally the respective one or more maximum threshold value(s) 8 to be associated with respective entity 6. Thus, as shown with support at least from FIGS. 1, 5 and 6, at least a first maximum threshold value 81 may beforehand be set—e.g. in the data table 40—for at least the first entity 61, which at least first maximum threshold value 81 may be adapted to suit for instance a priority and/or digital contents 41 of the at least first entity 61.

Action 1003

In Action 1003, the content selection system 1 determines the current position 21 and the current travel direction 22 of the user device 2. Correspondingly, the conditions determining unit 103 is adapted for determining the current position 21 and the current travel direction 22 of the user device 2. Thus, as shown with support at least from FIGS. 1 and 6, a prevailing estimated user device location 21 is established, as well as a prevailing estimated user device travel direction 22. The current user device position 21 may for instance be derived from the position determining unit 111, and the current travel direction 22 derived from the travel direction determining unit 112.

Action 1004

In optional Action 1004, the content selection system 1 may determine a current vehicle speed of the user device 2. Correspondingly, the conditions determining unit 103 may further be adapted for determining a current travel speed of the user device 2. The travel speed may for instance be derived from the travel speed determining unit 113.

Action 1005

In Action 1005, the content selection system 1 determines the current travel remainder for moving along a travel route 91 from the determined user device position 21 to at least the first entity 61 located ahead of the user device 22, based on the first digitally stored geographical location 611 associated with the first entity 61. Correspondingly, the travel remainder determining unit 104 is adapted for determining the current travel remainder for moving along a travel route 91 from the determined user device position 21 to at least the first entity 61 located ahead of the user device 22, based on the first digitally stored geographical location 611 associated with the first entity 61. Thus, as shown with support at least from FIGS. 1 and 6, a respective remainder for moving— e.g. travelling—from the current user device position 21 along a respective presumed travelable route 9 to one or more entities 6 is established taking into consideration at least the respective location(s) 601 of the one or more entities 6. Accordingly, the travel remainder is established in view of a presumed travel route 91 between the current user device position 21 and the at least first entity 61, rather than in view of a straight line there between.

Optionally, determining the current travel remainder may comprise determining a current travel distance from the determined current user device position 21 to the geographical location 611 of the at least first entity 61. Correspondingly, the travel remainder determining unit 104 may further be adapted for determining the current travel distance from the determined current user device position 21 to the geographical location 611 of the at least first entity 61. The at least first maximum threshold value 81 then comprises the first maximum threshold distance 811. Thus, as shown with support at least from FIGS. 1 and 6, the travel remainder in this scenario refers to a "travel distance", which for instance may be represented by a determined length of the travel route 9, such as the travel route 91 from the determined user device position 21 to the first entity 61.

Additionally or alternatively, optionally, determining the current travel remainder may comprise determining a current travel time from the determined current user device position 21 to the geographical location 611 of the at least first entity 61, additionally based on the travel speed determined in optional Action 104. Correspondingly, the travel remainder determining unit 104 may further be adapted for determining a current travel time from the determined current user device position 21 to the geographical location 611 of the at least first entity 61, additionally based on the travel speed. The at least first maximum threshold value 81 then comprises the first maximum threshold time 812. Thus, as shown with support at least from FIGS. 1 and 6, the at least first maximum threshold value 81 is then represented by a first maximum threshold time 812, and a determined user device travel speed is utilized to establish an estimated travel time to reach the at least first entity 61 from the determined current user device position 21.

Action 1006

In Action 1006, the content selection system 1 compares the travel remainder to at least the first digitally stored maximum threshold value 81 associated with the first entity 61. Correspondingly, the data comparing unit 105 is adapted for comparing the travel remainder to at least the first digitally stored maximum threshold value 81 associated with the first entity 61. Thus, as shown with support at least from FIGS. 1, 5 and 6, at least the first travel remainder is weighed against the one or more maximum threshold values 81, for at least the first entity 61.

Action 1007

In optional Action 1007, the content selection system 1 may derive foresight conditions input comprising one or more time availability indicating parameters. Correspondingly, the time availability deriving unit 106 may be adapted for deriving foresight conditions input comprising one or more time availability indicating parameters. Thus, as shown with support at least from FIGS. 1, 3 and 6, conditions indicating availability of time and/or foresight may be obtained.

Optionally, the one or more time availability indicating parameters may comprise a current travel speed of the user device 2, which travel speed optionally was determined in Action 1004, and which travel speed for instance may be derived from the travel speed determining unit 113. Additionally or alternatively, the one or more time availability indicating parameters may comprise a speed limit of a road 5 along which the user device 2 is determined to move and/or a presumed upcoming road, which speed limit for instance may be derived from the map data of the map database 24. Additionally or alternatively, the one or more time availability indicating parameters may comprise an estimated time to a specified destination 50 for the user device 2, which estimated time for instance may be derived from a navigation system of the user device 2 and/or vehicle 3. Additionally or alternatively, the one or more time availability indicating parameters may comprise a restricting time pertinent an upcoming planned activity specified in the calendar 26 associated with the user device 2, which restricting time for instance may be derived from said calendar 26. Additionally or alternatively, the one or more time availability indicating parameters may comprise a type of carrier 3 on which the user device 2 is carried; here a vehicle.

Action 1008

In optional Action 1008, the content selection system 1 may define the geographical limiting zone 7 extending in front of the user device 2, based on the current position 21, the current travel direction 22, and at least a first time availability indicating parameter of the foresight conditions input. Correspondingly, the zone defining unit 107 may be adapted for defining the geographical limiting zone 7 extending in front of the user device 2, based on the current position 21, the current travel direction 22, and at least a first time availability indicating parameter of the foresight conditions input. Thus, as shown with support at least from FIGS. 1, 3 and 6, an imaginary restricting area 7 extending ahead of the user device 2 is calculated in view of the current position 21 and travel direction 22 of the user device 2 and one or more parameters of the foresight conditions input, for instance the current vehicle speed.

Action 1009

In optional Action 1009, the content selection system 1 may compare the limiting zone 7 to the first geographical location 611. Correspondingly, the data comparing unit 105 may be adapted for comparing the limiting zone 7 to the first geographical location 611. Thus, as shown with support at least from FIGS. 1, 3, 5 and 6, the respective locations 601 of one or more entities 6 are considered in view of the determined limiting zone 7.

Action 1010

In Action 1010, the content selection system 1 enables the first piece of digital content 411 associated with the first entity 61 to be utilized by the user device 2, when the travel remainder is equal to or lower than the at least first maximum threshold value 81. Correspondingly, the content enabling unit 108 is adapted for enabling the first piece of digital content 411 associated with the first entity 61 to be utilized by the user device 2, when the travel remainder is equal to or lower than the at least first maximum threshold value 81. Thus, as shown with support at least from FIGS. 1, 2, 5 and 6, digital content 411 of the first entity 61 is not made available to the user device 2 until the travel remainder is determined—by the previous comparing Action 1006—to have a value equal to or lower than the at least first maximum threshold value 81. Accordingly, only digital content 41 of entities 6 determined to have—or to have had—maximum threshold values 8 greater than the corresponding travel remainder, is enabled to be utilized—e.g. presented—by the user device 2. Thereby, a yet more sophisticated filter mechanism is introduced, according to which digital content 41 of entities 6 having maximum threshold values 8 below corresponding respective travel remainder, is prevented from being utilized by the user device 2. Accordingly, rather than allowing digital content 41 of a potentially extensive amount of entities 6 to be made available to the user device 2, merely digital content 41 of a filtered amount of entities 6 is enabled to be utilized by the user device 2. Thus, the user device 2—and subsequently the user thereof, e.g. an occupant of a vehicle 3 on-board which the user device is carried—may be prevented from utilizing, e.g. being presented, digital content 41 associated with potentially irrelevant entities 6, i.e. entities having respective maximum threshold values 8 set lower than respective current travel remainder values. Moreover, since the respective maximum threshold values 8 may vary from one entity 6 to another, for instance depending on priorities and/or digital contents 41 thereof, a maximum threshold value 8 of one entity 6 may differ from a maximum threshold value 8 of another entity 6, for instance be set higher, thus enabling digital content 411 of for instance a first entity 61 to be enabled earlier than digital content 412 of a second entity 62. Accordingly, even though one or more entities 6 may be located essentially the same travel distance and/or travel time from the determined current user device position 21, i.e. have an essentially equal travel remainder, only digital content 41 of those entities having maximum threshold values 8 greater than the travel remainder, is enabled.

Thus, in view of the exemplifying conditions of FIG. 1, only the first piece of digital content 411, the second piece of digital content 412, the sixth piece of digital content 416 and the eighth piece of digital content 418, of respective first, second, sixth and eighth entities 61, 62, 66, 68, are enabled to be utilized by the user device 2, since the current travel remainder for moving along the first travel route 91 from the current user device position 21 to the first entity 61 is equal to or lower than the first maximum threshold value 81, the current travel remainder for moving along the second travel route 92 from the current user device position 21 to the second entity 62 is equal to or lower than the second maximum threshold value 82, the current travel remainder for moving along the sixth travel route 96 from the current user device position 21 to the sixth entity 66 is equal to or lower than the sixth maximum threshold value 86, and the current travel remainder for moving along the eighth travel route 98 from the current user device position 21 to the eighth entity 68 is equal to or lower than the eights maximum threshold value 88. Consequently, digital content 41 of remaining entities 6 of FIG. 1—i.e. the third, fourth, fifth and seventh entities 63, 64, 65, 67—is not enabled to be utilized by the user device 2, since the current travel remainder for moving along the third travel route 93 from the current user device position 21 to the third entity' 63, is not lower than or equal to the third maximum threshold value 83; a current travel remainder for moving along the fourth travel route 94 from the current user device position 21 to the fourth entity 64, is not lower than or equal to the fourth maximum threshold value 84; a current travel remainder for moving along the fifth travel route 95 from the current user device position 21 to the fifth entity 65, is not lower than or equal to the fifth maximum threshold value 85; and a current travel remainder for moving along the seventh travel route 97 from the current user device position 21 to the seventh entity 67, is not lower than or equal to the seventh maximum threshold value 87.

Moreover, optionally, the digital content 41 may comprise media content and the first piece of digital content 411 comprise the first piece of media content 4112 associated with the first entity 61. Thus, as shown with support at least from FIGS. 1 and 5, media content of one or more entities 6 may be enabled to be utilized by the user device 2, when the respective current travel remainders 9 to those entities 6 fall below respective maximum threshold values 8. Accordingly, media content—such as e.g. curiosa, information and/or facts in audio, text, video, URL etc. format—associated with those entities 6 may be made available for use by the user device 2, for instance for audible and/or visual presentation thereof. Thus, should the first entity 61 be represented by the exemplifying tourist attraction, and the first piece of media content 4112 be represented by e.g. parking guidance for parking in the vicinity of said tourist attraction 61, then said parking guidance 4112 would be enabled for utilization—e.g. presentation—by the user device 2, when the current travel remainder to the tourist attraction 61 falls below the at least first maximum threshold value 81.

Additionally or alternatively, optionally, the digital content 41 may comprise POI data and the first piece of digital content 411 comprise first POI data 4111 associated with the first entity 61. Enabling the first piece of digital content 411 to be utilized by the user device 2, then comprises enabling at least a portion of the first POI data 4111 on the digital map 251, 251' on the display 25 of the user device 2, as shown in FIGS. 2 and 4. Correspondingly, the content enabling unit 108 may further be adapted for enabling at least a portion of the first POI data 4111 on the digital map 251, 251' on the display 25 of the user device 2. Thus, as shown with support at least from FIGS. 1, 2 and 4, POI data of one or more entities 6 may be enabled to be e.g. displayed by the user device 2, when the respective current travel remainders to those entities 6 fall below respective maximum threshold values. Accordingly, at least a portion of POI data such as e.g. POI icons associated with those entities 6, may be made available for utilization e.g. visualized on the digital map 251, 251' on the display 25. Thus, as shown in FIG. 2—in view of the exemplifying conditions of FIG. 1—the first, second, sixth and eighth POI data 4111, 4121, 4161, 4181 of respective first, second, sixth and eighth entities 61, 62, 66, 68, are enabled to be utilized by the user device 2. Similarly, as shown in FIG. 4—in view of the additional exemplifying conditions of FIG. 3—the first and second POI data 4111, 4121 of respective first and second entities 61, 62 are enabled to be utilized by the user device 2. Should the first entity 61 be represented by the exemplifying tourist attraction, and the first POI data 4111 comprise at least a POI icon, then said POI icon 4111 would be enabled for display by the user device 2, when the current travel remainder to the tourist attraction 61 falls below the at least first maximum threshold value 81.

Optionally, and as indicated by Action 1010', the content selection system 1 may enable the first piece of digital content 411 associated with the first entity 61 to be utilized by the user device 2, when the travel remainder is equal to or lower than the at least first maximum threshold value 81 and the first geographical location 611 is within the limiting zone 7. Correspondingly, the content enabling unit 108 may further be adapted for enabling the first piece of digital content 411 associated with the first entity 61 to be utilized by the user device 2, when the travel remainder is equal to or lower than the at least first maximum threshold value 81 and the first geographical location 611 is within the limiting zone 7. Thus, as shown with support at least from FIGS. 3, 4, 5 and 6, digital content 411 of the first entity 61 is not made available to the user device 2 until the travel remainder is determined—by the previous comparing Action 1006—to have a value equal to or lower than the at least first maximum threshold value 81, and the geographical location 611 of the first entity 61 is determined—from the previous optional comparing Action 1009—to fall within the limiting zone 7. Accordingly, only digital content 41 of entities 6 determined to have—or to have had—maximum threshold values 8 greater than the corresponding travel remainder, and determined to have—or to have had—geographical locations 6 within the limiting zone 7, is enabled to be utilized—e.g. presented—by the user device 2. Thereby, a filter mechanism is introduced, according to which digital content 41 of entities 6 having maximum threshold values 8 below the travel remainder and/or geographical locations 6 beyond the limiting zone 7, is prevented from being utilized by the user device 2. Thus, in view of the additional exemplifying limiting zone 7 presented in FIG. 3, now only the first and second POI data 4111, 4121 of the respective first and second entities 61, 62 may be enabled—e.g. displayed—by the user device 2 as shown in FIG. 4, since only the first and second entities 61,62 fulfill the condition of having geographical locations 611, 612 falling within the limiting zone and having a respective travel remainder equal to or lower than corresponding maximum threshold value 81, 82.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a content selection system for in a timed manner enabling a user device on the move to utilize digital content associated with one or more entities located ahead of said user device, said method comprising:
    determining a current position and a current travel direction of said user device;
    determining a current travel remainder for moving along a travel route from said current position to at least a first entity located ahead of said user device, based on a first digitally stored geographical location associated with said at least first entity;
    comparing said travel remainder to at least a first digitally stored maximum threshold value associated with said at least first entity;
    deriving foresight conditions input comprising one or more time availability indicating parameters, wherein said one or more time availability indicating parameters include at least one of an estimated time to a specified destination for said user device, a restricting time pertinent to an upcoming planned activity specified in a calendar associated with said user device, or a type of carrier on which said user device is carried;
    defining a geographical limiting zone extending in front of said user device based on said current position, said travel direction, and at least one of said one or more time availability indicating parameters of said foresight conditions input;
    comparing said geographical limiting zone to said first digitally stored geographical location; and
    enabling a first piece of digital content associated with said at least first entity to be utilized by said user device, when said travel remainder is equal to or lower than said at least first digitally stored maximum threshold value and said first digitally stored geographical location is within said geographical limiting zone.

2. The method according to claim 1, wherein said digital content comprises media content and said first piece of digital content comprises a first piece of media content associated with said at least first entity.

3. The method according to claim 1, wherein said digital content comprises Point of Interest (POI) data and said first piece of digital content comprises first POI data associated with said at least first entity, wherein said enabling said first piece of digital content to be utilized by said user device, comprises enabling at least a portion of said first POI data on a digital map on a display of said user device.

4. The method according to claim 1, wherein determining said current travel remainder comprises determining a current travel distance from said current position to said first digitally stored geographical location of said at least first entity, and wherein said at least first digitally stored maximum threshold value comprises a first maximum threshold distance.

5. The method according to claim 1, further comprising:
    determining a current travel speed of said user device;
    wherein determining said current travel remainder comprises determining a current travel time from said current position to said first digitally stored geographical location of said at least first entity, additionally based on said current travel speed, and
    wherein said at least first digitally stored maximum threshold value comprises a first maximum threshold time.

6. The method according to claim 1, further comprising:
defining, for said one or more entities, respective one or more maximum threshold values; and
storing digitally said respective one or more maximum threshold values to be associated with respective entity.

7. The method according to claim 1,
wherein the geographical limiting zone includes an asymmetric sector.

8. A content selection system adapted for in a timed manner enabling a user device on the move to utilize digital content associated with one or more entities located ahead of said user device, said content selection system comprising:
at least one memory, wherein the memory stores instructions; and
at least one processor, wherein the at least one processor executes the instructions to:
determine a current position and a current travel direction of said user device;
determine a current travel remainder for moving along a travel route from said current position to at least a first entity located ahead of said user device, based on a first digitally stored geographical location associated with said at least first entity;
compare said travel remainder to at least a first digitally stored maximum threshold value associated with said at least first entity;
derive foresight conditions input comprising one or more time availability indicating parameters, wherein said one or more time availability indicating parameters include at least one of an estimated time to a specified destination for said user device, a restricting time pertinent to an upcoming planned activity specified in a calendar associated with said user device, or a type of carrier on which said user device is carried;
define a geographical limiting zone extending in front of said user device based on said current position, said travel direction, and at least one of said one or more time availability indicating parameters of said foresight conditions input, and wherein a comparison of said geographical limiting zone to said first digitally stored geographical location is made; and
enable a first piece of digital content associated with said at least first entity to be utilized by said user device, when said travel remainder is equal to or lower than said at least first digitally stored maximum threshold value and said first digitally stored geographical location is within said geographical limiting zone.

9. The content selection system according to claim 8, wherein said digital content comprises media content and said first piece of digital content comprises a first piece of media content associated with said at least first entity.

10. The content selection system according to claim 8, wherein said digital content comprises Point of Interest (POI) data and said first piece of digital content comprises first POI data associated with said at least first entity, wherein said at least one processor further executes the instructions to:
enable at least a portion of said first POI data on a digital map on a display of said user device.

11. The content selection system according to claim 8, wherein said at least one processor further executes the instructions to:
determine a current travel distance from said current position to said first digitally stored geographical location of said at least first entity, and wherein said at least first digitally stored maximum threshold value comprises a first maximum threshold distance.

12. The content selection system according to claim 8, wherein said at least one processor further executes the instructions to:
determine a current travel speed of said user device; and
determine a current travel time from said current position to said first digitally stored geographical location of said at least first entity, additionally based on said current travel speed; and
wherein said at least first digitally stored maximum threshold value comprises a first maximum threshold time.

13. The content selection system according to claim 8, wherein said at least one processor further executes the instructions to:
define, for said one or more entities, respective one or more maximum threshold values; and
store digitally said respective one or more maximum threshold values to be associated with respective entity.

14. The content selection system according to claim 8,
wherein the geographical limiting zone includes an asymmetric sector.

15. A user device comprising a content selection system configured to in a timed manner enable said user device on the move to utilize digital content associated with one or more entities located ahead of said user device, said content selection system comprising:
at least one memory, wherein the memory stores instructions; and
at least one processor, wherein the at least one processor executes the instructions to:
determine, a current position and a current travel direction of said user device;
determine a current travel remainder for moving along a travel route from said current position to at least a first entity located ahead of said user device, based on a first digitally stored geographical location associated with said at least first entity;
compare said travel remainder to at least a first digitally stored maximum threshold value associated with said at least first entity;
derive foresight conditions input comprising one or more time availability indicating parameters, wherein said one or more time availability indicating parameters include at least one of an estimated time to a specified destination for said user device, a restricting time pertinent to an upcoming planned activity specified in a calendar associated with said user device, or a type of carrier on which said user device is carried;
define a geographical limiting zone extending in front of said user device based on said current position, said travel direction, and at least one of said one or more time availability indicating parameters of said foresight conditions input;
compare said geographical limiting zone to said first digitally stored geographical location; and
enable a first piece of digital content associated with said at least first entity to be utilized by said user device, when said travel remainder is equal to or lower than said at least first digitally stored maximum threshold value and said first digitally stored geographical location is within said geographical limiting zone.

* * * * *